United States Patent [19]
Rao et al.

[11] Patent Number: 5,584,265
[45] Date of Patent: Dec. 17, 1996

[54] METHOD FOR REDUCING $NO_x$ IN THE EXHAUST STREAMS OF INTERNAL COMBUSTION ENGINES

[75] Inventors: Vemulapalli Durga N. Rao, Bloomfield Township; Harry A. Cikanek, Northville, both of Mich.

[73] Assignee: Ford Motor Company, Dearborn, Mich.

[21] Appl. No.: 411,911

[22] Filed: Mar. 27, 1995

Related U.S. Application Data

[63] Continuation of Ser. No. 86,400, Jul. 6, 1993, abandoned.

[51] Int. Cl.$^6$ ............................ F02B 75/12; C10L 1/22
[52] U.S. Cl. ............................ 123/1 A; 423/235; 423/212; 44/335; 60/39.461
[58] Field of Search .................. 423/239.1, 235, 423/212; 44/335; 123/549, 1 A; 60/39.461

[56] References Cited

U.S. PATENT DOCUMENTS

| | | | |
|---|---|---|---|
| 3,630,184 | 12/1971 | Wolf et al. | 123/549 |
| 3,689,195 | 9/1972 | Beesch et al. | 123/179.21 |
| 3,846,981 | 11/1974 | Paczkowski | 423/212 |
| 3,900,554 | 8/1975 | Lyon | 423/235 |
| 4,028,275 | 6/1977 | Sakai et al. | 252/466 PT |
| 4,166,724 | 9/1979 | Kanao | 44/451 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,509,492 | 4/1985 | Ochiai et al. | 123/569 |
| 4,541,367 | 9/1985 | Lindberg | 123/25 |
| 4,544,388 | 10/1985 | Rao et al. | 55/282 |
| 4,621,593 | 11/1986 | Rao et al. | 123/1 A |
| 4,655,037 | 4/1987 | Rao | 60/274 |
| 4,670,020 | 6/1987 | Rao | 44/57 |
| 4,719,094 | 1/1988 | Rieckert et al. | 423/235 |
| 4,731,231 | 3/1988 | Perry | 423/235 |
| 4,744,962 | 5/1988 | Johnson et al. | 423/235 |
| 4,800,068 | 1/1989 | Perry | 422/173 |
| 4,861,567 | 8/1989 | Heap et al. | 423/235 |
| 4,886,650 | 12/1989 | Perry | 423/235 |
| 4,908,193 | 3/1990 | Perry | 423/235 |
| 4,966,873 | 10/1990 | Iida et al. | 502/84 |
| 4,973,399 | 11/1990 | Green et al. | 208/120 |

(List continued on next page.)

FOREIGN PATENT DOCUMENTS

| | | |
|---|---|---|
| 0275842 | 3/1988 | European Pat. Off. . |
| 0527362 | 11/1993 | European Pat. Off. . |
| 2-191524 | 7/1990 | Japan ............ 423/239.1 |
| 2-261519 | 10/1990 | Japan ............ 423/212 |
| 1191464 | 4/1970 | United Kingdom . |
| WO8200175 | 6/1982 | WIPO . |

OTHER PUBLICATIONS

"Nitric Oxide: Surface Reactions and Removal from Auto Exhaust.", by M. Shelef, Catalysis Reviews–Science and Engineering, vol. 11(1), 1975, pp. 1–40.

(List continued on next page.)

*Primary Examiner*—Michael Lewis
*Assistant Examiner*—Peter T. DiMauro
*Attorney, Agent, or Firm*—Lorraine S. Melotik; Roger L. May

[57] ABSTRACT

The invention discloses a method of reducing the concentration of $NO_x$ in the exhaust streams of internal combustion ignitions wherein a selected producing agent is introduced into the combustion chamber of such an engine via the fuel and/or air feed stream introduced into the combustion chamber. Also disclosed is an apparatus for reducing the concentration of $NO_x$ in the exhaust streams of internal combustion engines having a piston-cylinder assembly having an air fuel mixture contained therein, a means for storing a selective reducing agent selected from the group consisting of ammonia, hydrazine and cyanuric acid and a means for introducing the reducing agent into the lean air/fuel mixture before combustion occurs such that upon combustion of the air/fuel mixture, the reducing agent decomposes to react with one or more products of combustion to produce an engine exhaust stream having a reduced concentration of $NO_x$.

8 Claims, 4 Drawing Sheets

U.S. PATENT DOCUMENTS

| | | | |
|---|---|---|---|
| 4,978,514 | 12/1990 | Hofmann et al. | 423/235 |
| 5,058,514 | 10/1991 | Mozes et al. | 110/345 |
| 5,087,431 | 2/1992 | Gardner-Chavis et al. | 423/239 |
| 5,199,959 | 4/1993 | Sung et al. | 44/336 |
| 5,219,955 | 6/1993 | Sung et al. | 44/336 |
| 5,234,477 | 8/1993 | Gwyn | 423/235 |
| 5,307,772 | 5/1994 | Rao et al. | 123/272 |

OTHER PUBLICATIONS

"A Chemical Kinetic Model for the Selective Reduction of Nitric Oxide by Ammonia", by James A. Miller et al., Combustion and Flame, 1981, vol. 43, pp. 81–98.

"Kinetic Modeling of the Oxidation of Ammonia in Flames", by James A. Miller et al., Combustion Science and Technology, 1983, vol. 34, pp. 149–176.

"Kinetics of the reactions of NCO radicals with H2 and NO using laser photolysis–laser induced fluorescence", by R. A. Perry et al., Journal of Chewmistry and Physics, vol. 82(12), Jun. 15, 1985, pp. 5485–5488.

"Rapid reduction of nitrogen oxides in exhaust gas streams" by R. A. Perry et al., Nature, vol. 324, Dec. 18/25, 1986, pp. 657–658.

"Thermal DeNOx: Controlling nitrogen oxides emissions by a noncatalytic process", Richard K. Lyon, Environ. Sci. Technol., vol. 21, No. 3, 1987, pp. 231–235.

"An advanced selective reduction process for NOx control", by M. P. Heap et al., Nature, vol. 35, Oct. 13, 1988, pp. 620–622.

"Comparison of Nitric Oxide Removal by Cyanuric Acid and by Ammonia", by J. A. Caton et al., Combust. Sci. and Tech., 1989, vol. 65, pp. 277–293.

"Limitations on the rapid reduction of nitrogen oxides in exhaust gas streams", by Brian G. Wicke et al., Nature, vol. 338, Apr. 6, 1989, pp. 492–493.

"Early Engine Emission Reduction Test Results with RAPRENOX", by Ralph J. Slone et al., Cummins Engine Co., Inc., pp. 457–464.

"Cyanuric and Isocyanuric Acids", Encyclopedia of Chemical Technology, vol. 7, pp. 397–399.

"Material Safety Data Sheet on Cyanuric Acid H 94% Granular", Product #CPE650160, From The Olin MSDS Control Group, Rev. Jan. 1, 1990, 12 pages.

"Catalyst Technologies to Meet Future Emission Requirements for Gasoline–Fueled Vehicles", by Jerry C. Summers, Clean Air Technology News, Summer 1991, pp. 1–2.

"Monopropellant Hydrazine Design Data", Rocket Research Corporation, pp. 11–68.

METHOD FOR REDUCING NO$_x$ IN THE EXHAUST STREAMS OF INTERNAL COMBUSTION ENGINES

This is a continuation of application Ser. No. 08/086,400, filed on Jul. 6, 1993, now abandoned.

TECHNICAL FIELD

This application relates to the reduction of NO$_x$ in the exhaust streams of internal combustion engines and particularly to the reduction of NO$_x$ in the exhaust streams of such engines having lean air/fuel ratios. It also relates to an apparatus for reducing the concentration of NO$_x$ in the exhaust streams of internal combustion engines, particularly those having lean air/fuel ratios, such as diesel engines and lean burning spark ignition engines.

BACKGROUND ART

In recent years, the generation of nitrogen oxides (NO$_x$) by internal combustion engines has been the focus of increasing government regulation. NO$_x$ are believed to contribute to tropospheric ozone, a health hazard, and to also undergo a process known as photochemical smog formation in the presence of sunlight and hydrocarbons. NO$_x$ significantly contribute to the formation of acid rain and have been implicated as contributing to the undesirable warming of the atmosphere or greenhouse effect. It is anticipated that allowable NO$_x$ emissions for motor vehicles will be significantly decreased in the coming years.

Unfortunately, however, attempts to reduce NO$_x$ emissions in internal combustion engines, particularly those using lean air/fuel mixtures such as diesel engines, have generally resulted in only inadequate NO$_x$ reduction with a concurrent increase in particulate emissions. While NO$_x$ emissions in the exhaust streams of spark ignition engines (S.I.) have been somewhat reduced with the use of standard redox catalysts, the lean exhaust streams inherent in diesel engines have precluded such use. Lean air/fuel mixtures are herein defined as containing more air than fuel while a rich mixture contains less air.

Diesel engines in particular have posed a significant problem. They have the disadvantage of producing emissions with significant concentrations of NO$_x$ and particulates. The latter are generally manifested in the form of a black exhaust smoke or soot. Diesel engines also have a reputation for exhibiting significant noise and vibration during operation.

The control of automotive NO$_x$ emissions has traditionally been dependent on the use of three way catalysts (TWC), exhaust gas recirculation (EGR), the use of very fuel-rich or "reducing" engine exhaust conditions and/or retardation of injection timing.

Unfortunately, however, the use of three way catalysts often requires expensive and easily damaged exhaust oxygen sensors. Precise control and maintenance of the air/fuel ratio in a narrow band in the vicinity of stoichiometry is necessary. Also, as indicated above, the lean operating conditions of diesel engines and lean burn S.I. engines preclude the use of three way catalysts and reduction catalysts as cost effective methods for reducing NO$_x$ to the levels mandated by current and future government regulation.

Although present emission control systems incorporate EGR, its use has several disadvantages. Excessive use of EGR can cause rough combustion. Fouling of the injectors can result in loss of fuel economy due to a reduction in the combustion burn rate as well as a potential increase in hydrocarbon emissions.

Finally, although retarding the fuel injection timing can reduce NO$_x$ emissions, the amount of reduction that can practically be achieved is limited. This method of controlling NO$_x$ also has the significant disadvantage of reducing fuel economy.

The present invention resolves these deficiencies of the prior art by providing a NO$_x$ emission control system. The invention provides a method and apparatus wherein a selective reducing agent is introduced into the interior of a piston cylinder assembly, i.e. combustion chamber, of an internal combustion engine. The selective reducing agent is incorporated into the fuel feed stream and/or the air feed streams which combine to form the air/fuel mixture combusted in the engine. A characteristic of the invention is that the amount of selective reducing agent introduced into the combustion chamber is a function of the engine load. Upon the combustion of the air/fuel mixture containing the reducing agent, the treatment agent decomposes to react with one or more products of combustion to produce an engine exhaust stream having a reduced concentration of NO$_x$.

Although the invention is particularly advantageous when used in compression ignition engines utilizing lean air-fuel mixtures, it may also be incorporated in engines having rich operating conditions such as traditional spark ignition engines.

Although the prior art has disclosed the use of selective reducing agents as a method of controlling NO$_x$ in combustion exhaust streams, no method or apparatus has been disclosed for use in automotive systems which incorporates the agent in the fuel and/or air feed streams entering the combustion chamber.

Unlike the instant invention, none of the prior art has achieved desired reductions of from 50 to 80% in NO$_x$ concentrations using overall ratios of NO$_x$ to selective reducing agent of 2:1 to as low as 10:1. It has been found that in the instant invention, the amount of reducing agent required is a function of when in the operating cycle the agent is introduced into the combustion chamber and how much NO$_x$ is generated during that portion of the cycle.

Prior art patents disclosing the use of cyanuric acid to reduce NO$_x$ emissions such as U.S. Pat. Nos. 4,731,231; 4,800,068; 4,886,650; and 4,908,193 to Perry, disclose the incorporation of cyanuric acid into an exhaust stream post-combustion. These prior art patents teach that large amounts of solid cyanuric acid are required to achieve desirable automotive exhaust streams. In addition, these patents fail to provide practical, efficient and cost effective methods of using cyanuric acid in consumer vehicles. According to the teachings of these patents, such systems will preferably be designed to utilize stoichiometric amounts of NO$_x$ and HNCO where excesses of either NO$_x$ or HNCO are used. Acceptable levels of excess NO$_x$ and HNCO are taught to be "in the range of about 1.01 to about 1.1 or more on a stoichiometric basis". Finally, the overall disclosures of these prior art patents teach away from the use of cyanuric acid in oxygen rich environments.

U.S. Pat. No. 4,861,567 to Heap et al. expressly teaches that the decomposition of cyanuric acid must take place in an "oxygen free (fuel rich) environment".

As a result, such prior art patents fail to provide a method whereby the NO$_x$ emissions of internal combustion engines in general, and, those of diesel engines and lean burn spark ignition engines in particular, can be reduced with the use of selective reducing agents in a manner which is both practical, highly effective and economical.

SUMMARY OF THE INVENTION

The instant invention addresses the deficiencies of the prior art by providing a method of reducing $NO_x$ concentrations in the exhaust streams of internal combustion engines. It may be used to particular advantage in diesel engines and lean burn S.I. engines.

According to the invention, a selective reducing agent is introduced into the combustion chamber as part of the fuel and/or air feed streams. Once combustion is begun as a result of the heat release accompanying the introduction of the air/fuel mixture, the selective reducing agent begins to decompose and react with one or more products of combustion to produce an exhaust stream having a reduced concentration of $NO_x$. The reducing agent reduces the flame temperature because of the heat absorbed due to the decomposition of the agent. Since $NO_x$ formation is a strong function of temperature, the actual amount of $NO_x$ formed is reduced. As a result, the amount of the reducing agent needed to achieve $NO_x$ reduction to desired level is also reduced.

The invention also provides an apparatus for reducing the concentration of $NO_x$ in the exhaust streams of internal combustion engines. The apparatus consists of a piston-cylinder assembly having an interior in which an air/fuel mixture may be introduced and combusted, a means for storing a selective reducing agent selected from the group consisting of ammonia, hydrazine, and cyanuric acid, and a means for introducing the reducing agent into the interior of the piston-cylinder assembly, such that upon combustion of the air and fuel mixture, the reducing agent will decompose and react with one or more products of combustion to produce an engine exhaust stream having a reduced concentration of $NO_x$.

The instant invention is generally applicable to internal combustion engines and most particularly to those with lean operating conditions, such as diesel engines, including D.I. and I.D.I. diesel engines, as well as lean burn S.I. gasoline engines. The $NO_x$ emission control system of the invention is readily adaptable to modern engines which use computer control fuel injection rate shaping or air/fuel ratio control strategies.

The instant invention will most preferably introduce a selective reducing agent into the interior of a piston-cylinder assembly of a compression ignition engine. The selective reducing agent will be introduced into the air/fuel mixture via the fuel feed stream and/or the air feed streams.

Decomposition of the reducing agent will begin when combustion is initiated. The combustion process can be subdivided into two phases. The 'premixed' flame phase results from fuel injected prior to the start of ignition and mixed with combustion air. Fuel which is injected after the start of ignition combusts in a diffusion flame. The period between fuel injection and auto ignition is defined as ignition delay.

That portion of the combusted fuel which burns as a very rapid premixed flame is primarily responsible for the pressure increase and very high flame temperatures, and is thus a primary cause of combustion noise and the generation of $NO_x$. $NO_x$ formation is a function of oxygen concentration and flame temperature. During the precombustion period, the oxygen concentration is high, and depending on the amount of fuel present before the auto ignition, the flame temperature can be very high. Traditionally, the longer the ignition delay, the higher the flame temperature and resultant increase in $NO_x$ formation.

In the instant invention, however, the presence of the selective reducing agent in either or both of the components of the air/fuel mixture allows for the immediate and in some cases, continuous, reduction of $NO_x$ as they are formed. The ignition delay period is also the period of contact of the vaporous fuel air mixture with the selective reducing agent. Since the premix combustion phase heavily contributes to the formation of $NO_x$, the presence of this strong reducing agent acts to immediately minimize $NO_x$ concentrations by (1.) absorbing heat by vaporization and/or sublimation and thus reducing flame temperature and by (2.) actually reacting with $NO_x$.

The amount of reducing agent introduced into the interior of the piston-cylinder assembly, i.e. the combustion chamber, will vary in response to increased engine load. When the reducing agent is incorporated into the fuel stream, increased engine load will result in an increase in the amount of fuel entering the combustion chamber and a concurrent increase in the quantity of reducing agent introduced.

Alternatively, when the reducing agent is in the incoming air stream, the quantity of reducing agent delivered to the combustion chamber will be regulated by a control unit measuring the peak combustion temperatures. Since increased combustion temperatures are a function of increased engine load, more reducing agent can be delivered by the control unit as required to maintain desired levels of $NO_x$ in the engine exhaust stream.

The invention is advantageous in that use of the disclosed method and apparatus results in a practical, cost effective and highly efficient way to reduce the level of $NO_x$ in automotive exhaust streams. Reductions of between 50 to 80% in $NO_x$ concentrations are possible.

A particular advantage of the invention is that traditional three-way catalysts (TWC) may be used concurrently. Combining the method and apparatus of the invention with a TWC allows for the use of air/fuel ratios designed to optimize the performance of the TWC. The need for rigid control of the air/fuel ratio becomes less important.

An additional benefit of the invention is a decrease in the poisoning of TWC and other traditional exhaust catalysts.

It is therefore, an object of the present invention to provide a method for reducing the $NO_x$ concentration present in the exhaust streams of automotive internal combustion engines such as compression ignition engines and lean burn spark ignition engines.

It is another object of the present invention to provide an apparatus for reducing the $NO_x$ concentration present in the exhaust streams of automotive internal combustion engines such as compression ignition engines and lean burn spark ignition engines.

Accordingly, the present invention broadly pertains to a method for reducing the concentration of $NO_x$ in an exhaust stream of an internal combustion engine having a combustible air/fuel mixture in an interior of a piston-cylinder assembly, comprising the steps of providing a selective reducing agent and introducing an effective amount of the selective reducing agent into the interior of the piston-cylinder assembly, wherein, upon combustion, the selective reducing agent decomposes to react with one or more products of combustion to produce an exhaust stream having a reduced concentration of $NO_x$.

The invention further broadly provides for an apparatus for reducing the concentration of $NO_x$ in an exhaust stream of an internal combustion engine, comprising a piston-cylinder assembly having an air/fuel mixture contained therein, means for storing a selective reducing agent selected from the group consisting of ammonia, hydrazine, and cyanuric acid, means for introducing the reducing agent into the air/fuel mixture, such that upon combustion of the air and fuel mixture, the reducing agent will decompose to react with one or more products of combustion to produce an engine exhaust stream having a reduced concentration of $NO_x$.

BEST MODE FOR CARRYING OUT THE INVENTION

Figure 1:
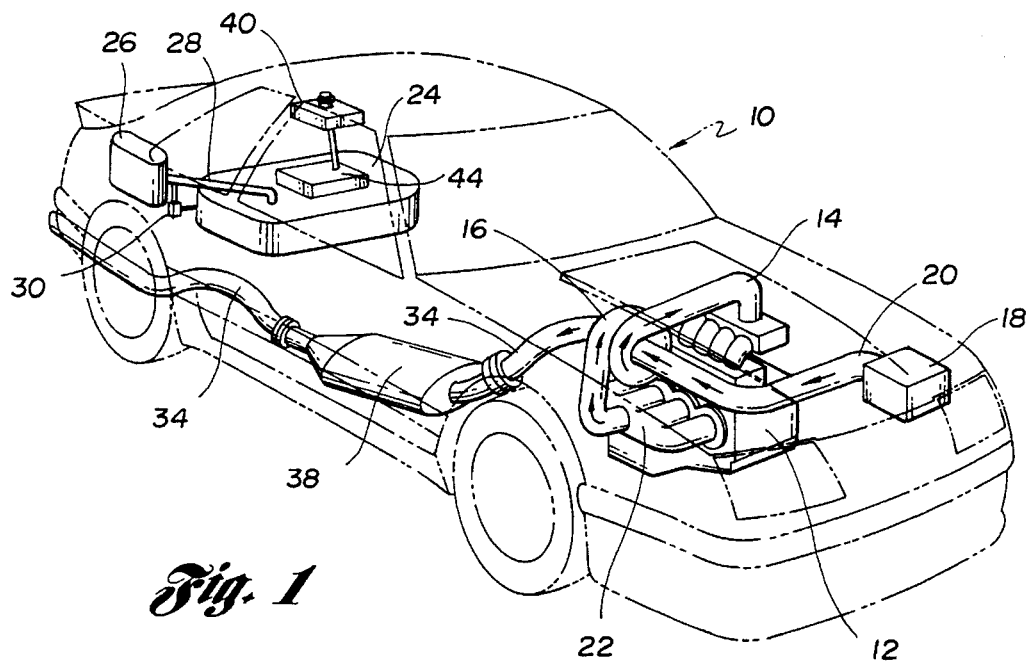
FIG. 1 is a perspective of an automotive vehicle with a diesel engine having the $NO_x$ emission control system of the invention.

FIG. 1 shows a most preferred embodiment of the $NO_x$ emission control system of the invention as disclosed in an automotive vehicle 10, shown in phantom, having a diesel engine 12. In this most preferred embodiment, the reducing agent is delivered to the combustion chamber via the fuel stream.

Air is provided to the intake manifold 14 of the engine 12 by means of turbocharger 16. Turbocharger 16 receives ambient air by way of air filter 18 and air intake conduit 20. Turbo charger 16 is also connected to the engine 12's exhaust manifold 22 and is driven by the exhaust gases emitted from the engine 12.

Figure 2:
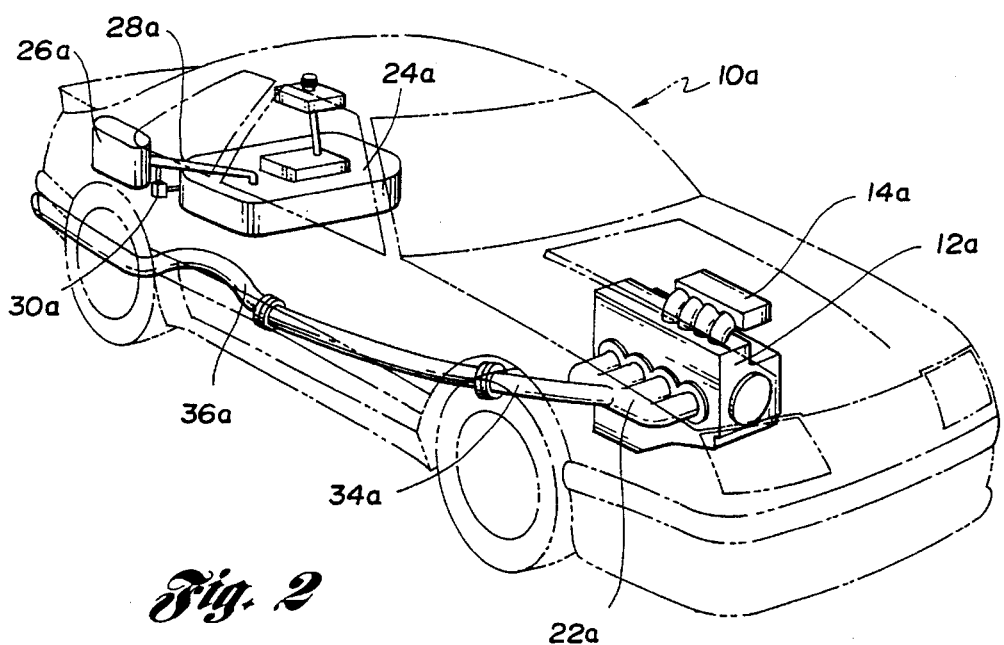
FIG. 2 is a perspective of an automotive vehicle having a S.I. engine and a first alternative embodiment of the $NO_x$ emission control system of FIG. 1.

It will be appreciated by those skilled in the art that the turbocharger 16 is an optional attachment to the diesel engine 12 and is not required for the successful operation of the $NO_x$ emission control system of the invention. As illustrated in FIG. 2, internal combustion engines without turbochargers, such as the S.I. engine 12a of FIG. 2, are suitable for use with the present invention.

Returning to FIG. 1, fuel for use in diesel engine 12 is stored in fuel tank 24. Storage means 26 will contain the selective reducing agent of the invention. Storage means 26 is connected to fuel tank 24 by means of connecting line 28.

Storage means 26 will most preferably be a tank and may be located anywhere in the vehicle, provided that the position of the storage means does not impede the storage, maintenance and ultimate delivery of the reducing agent contained therein. Most preferably, storage means 26 will be located in the rear of vehicle 10 and in close proximity to fuel tank 24. Storage means 26 may be comprised of any suitable material such as plastic, metal and/or combinations thereof, so long as storage and maintenance of the reducing agent is possible over the lifetime of vehicle 10.

For the purposes of the most preferred embodiment of the $NO_x$ emission control system disclosed in FIG. 1, storage means 26 will be designed to contain and deliver a liquid treatment agent solution. The treatment agent solution will be comprised of the selective reducing agent dissolved in a solvent which is soluble in the vehicle fuel. Suitable selective reducing agents will include isocyanuric acid and cyanuric acid, where the hydroxyl groups on the cyanuric acid may be substituted by 1–3 $NH_2$, alkyl, NH-alkyl or N-alkyl$_2$ groups where the alkyl groups will have from 1 to 4 carbons. For the purposes of this invention, isocyanuric acid and cyanuric acid are considered to be equivalent. Other suitable selective reducing agents include species such as ammonia ($NH_3$) and hydrazine ($N_2H_4$). Of these, and in this most preferred embodiment, cyanuric acid is most preferred.

Most preferably, when used with compression ignition engines, the reducing agent will be dissolved in a solvent which may be characterized as a Cetane improver. When the $NO_x$ emission control system is used in a spark ignition engine, the solvent will most preferably be a flame retardant solvent. The solvent will preferably have a composition such that introduction of the solvent into the combustion chamber will lower the flame temperatures.

Suitable solvents will be those in which the desired reducing agent is soluble and which are soluble in the vehicle fuel. Solvents such as dimethylsulfoxide (DMSO), dimethylacetamide (DMA), dimethylfuramide, amyl acetate and dimethylpyradine are suitable. Cetane improvers well known in the industry may also be used for dissolving cyanuric acid and its equivalents. It should be noted, however, that the solubility of the agent is somewhat small in some of these solvents. In these cases the preferred solvent will also be chosen on the basis of its Cetane improving characteristics. Such a solvent choice will reduce the ignition delay and thus reduces the amount of $NO_x$ produced.

The most preferred treatment agent solution contained in storage means 26 will be comprised of cyanuric acid dissolved in dimethylsulfoxide and/or dimethylacetamide. The latter solvent is particularly advantageous when an oxidation catalyst is used downstream of a particulate trap filter.

The concentration of the treatment agent solution will depend upon the reducing agent selected and its solubility in a chosen solvent. It is preferred that the treatment agent solution be as concentrated as possible. Concentrations of 18% HNCO in DMSO and 12% in DMA are suitable.

The treatment agent solution will be delivered to fuel tank 24 via connecting line 28 automatically when the vehicle 10 is refueled. The quantity of treatment agent solution (and thus of the reducing agent) delivered to the fuel tank 24 via line 28 will be proportional to the amount of fuel introduced into the tank 24 and will be a function of the concentration of the treatment agent solution and the type of fuel. Most preferably, 0.1 to 0.5 grams of cyanuric acid will be added per gallon of fuel. Greater amounts will be added to diesel fuels, while the lower weight range may be used for gasoline fuels.

The regulation of the delivery of sufficient amounts of the treatment agent solution from storage means 26 to fuel tank 24 via line 28 will be controlled via control means 30. Those skilled in the art will appreciate that existing control systems may be suitably employed as a means 30.

The introduction of the treatment agent solvent into fuel tank 24 will result in the formation of a homogeneous mixture of the fuel and the treatment agent solution. The resulting mixture may be termed a "treated fuel mixture". This treated fuel mixture will be contained in fuel storage means 24 and will be delivered to engine 12 in a conventional manner.

Introduction of the treated fuel mixture into the interiors of the piston cylinder assemblies, i.e. combustion chamber, of engine 12 will be in a conventional manner and will initiate the 'premixed' flame combustion phase discussed above.

Upon the application of heat, the selective reducing agent will decompose to form reactive species capable of reducing $NO_x$ to $N_2$. While the temperature at which the various reducing agents will decompose will vary, all of the agents discussed above will begin to decompose upon introduction to the combustion chambers of engine 12. An advantage of this embodiment of the invention is that as more fuel enters and is combusted to form $NO_x$, proportional amounts of the reducing agent will likewise become available to react with the $NO_x$.

Thus, reduction of $NO_x$ will begin with and continue during the premixed flame combustion phase until auto ignition. It will likewise continue in the diffusion flame combustion phase while additional fuel enters the chamber and during the lifetime of the reactive decomposition products.

While not wishing to be bound to any particular theory, it is believed that the most preferred selective reducing agent will decrease $NO_x$ according to the following reaction mechanism:

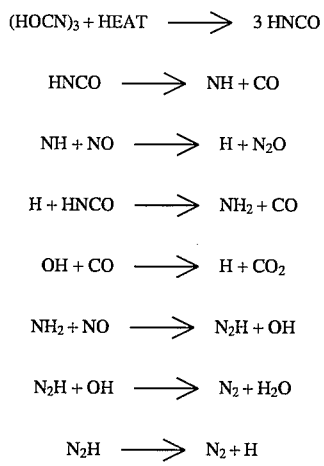

At the completion of the combustion cycle, engine exhaust will exit via exhaust manifold 22 and exhaust conduit 34.

Although not necessary to the operation of the $NO_x$ emission control system broadly disclosed herein, most preferably, the disclosed $NO_x$ emission control system will be combined with a particulate trap 38 and an organometallic fuel additive. The most preferred particulate trap and organometallic fuel additive incorporated with the $NO_x$ emission control system disclosed herein are disclosed in U.S. patent application Ser. No. 07/952,274, filed Sep. 28, 1992, entitled "A Particulate and Exhaust Gas Emission Control System", by Vemulapalli D. N. Rao and Harry A. Cikanek, which is herein incorporated by reference. As described therein, the particulate trap 38 will most preferably be regenerative and self cleaning with the use of an organometallic fuel additive. The fuel additive will most preferably be contained in additive tank 40 and delivered to fuel tank 24 via connecting 42. The amount of fuel additive delivered to the fuel tank 24 will be regulated via metering device 47.

Turning to FIG. 2, a second alternative embodiment of the $NO_x$ emission control system is disclosed. Engine 12a is a spark ignition engine shown in vehicle 10a drawn in phantom. Although not necessary, it will most preferably have lean air/fuel ratios.

Intake air is introduced into engine 12a via air intake manifold 14a. As discussed previously, the turbocharger 16 illustrated in FIG. 1 is not present in FIG. 2. Exhaust gases exit engine 12a via exhaust manifold 22a. They exit vehicle 10a through exhaust conduit 34a and tailpipe 36a at the rear of vehicle 10a.

The reducing agent will be as described above and will be contained within storage tank 26a, most preferably as a liquid treatment solution. At periods of refueling, appropriate amounts of reducing agent, as determined by control means 30a, will be delivered to fuel tank 24. A homogeneous mixture of fuel and reducing agent (i.e. treatment agent solution) will be formed. The resulting treated fuel mixture will be contained in fuel tank 24a and delivered to engine 12a via conventional means.

It will be appreciated that with increasing engine load, greater amounts of fuel will be delivered to engine 12a. As a result, correspondingly greater of amounts of reducing agent will likewise arrive in the combustion chamber along with the additional fuel.

Upon the delivery of the treated fuel mixture to the combustion chamber of the S.I. engine 12a, combustion will take place. As with the ignition delay in the diesel engine, the period between fuel injection and ignition will serve to contact the vaporous fuel mixture with the decomposition products of the reducing agent. Post ignition, the reactive species will react with and reduce $NO_x$ as they are formed. Upon completion of the combustion cycle, engine exhaust gas with reduced $NO_x$ concentrations will exit via exhaust manifold 22a, and out the rear of vehicle 10a via exhaust tail pipe 36a.

It will be appreciated that FIG. 2 omits the particulate trap 38 and organometallic fuel additive disclosed in the most preferred embodiment of FIG. 1. Although they will preferably be used with the disclosed invention, they are not necessary to its operation.

Turning now to FIGS. 3 through 6, alternative embodiments of the invention are shown wherein the selective reducing agent is delivered via the air stream entering the combustion chamber.

FIGS. 3, 4, 5 and 6 illustrate the $NO_x$ emission control system of the invention wherein the selective reducing agent is delivered to the combustion chamber via the EGR system of a diesel engine.

Figure 3:
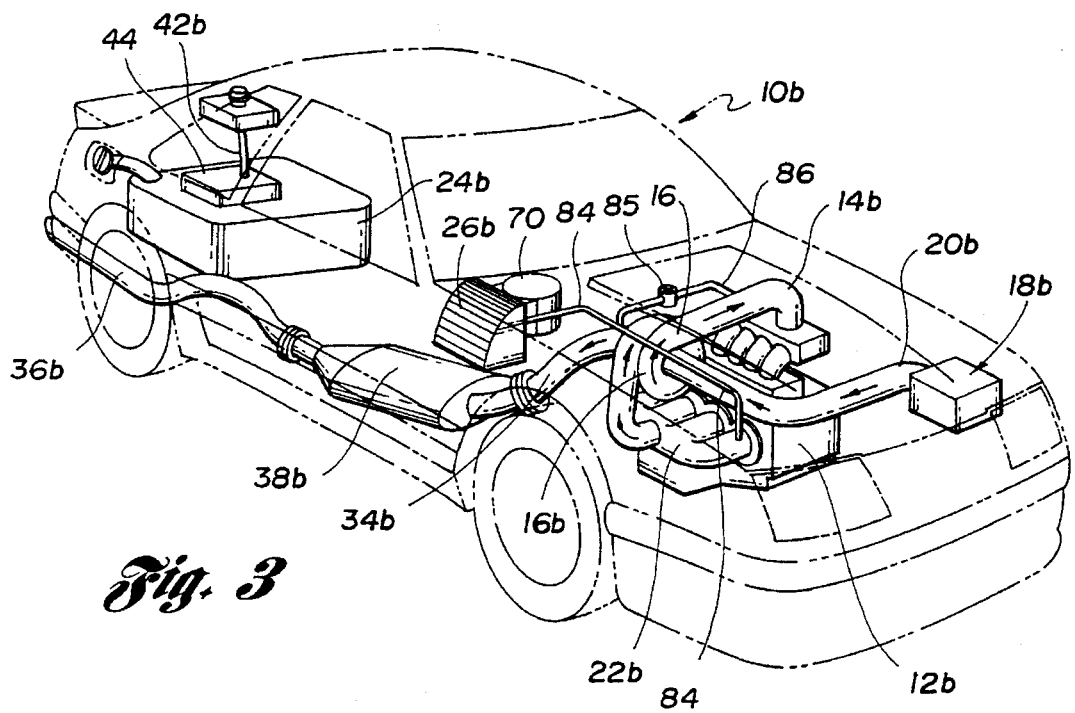
FIG. 3 is a perspective of an automotive vehicle having a diesel engine and a second alternative embodiment of the $NO_x$ emission control system of the invention.

In FIG. 3, the selective reducing agent is introduced into the engine exhaust stream at the exhaust manifold 22b. Intake air enters vehicle 10b, drawn in phantom, via air intake filter 18b and travels to turbocharger 16b in intake conduit 20b. This intake air is compressed in turbocharger 16b and enters the combustion chambers of engine 12b through air intake manifold 14b. After combustion, the engine exhaust stream exits engine 12b at exhaust manifold 22b to work turbocharger 16. The engine exhaust stream then enters exhaust conduit 34b. Subsequent to entering exhaust conduit 34b, a portion of the exhaust stream is diverted by EGR line 84 and recycled back to air intake manifold 14b by EGR valve 85. The remainder of the exhaust stream passes through optional regenerative particulate trap 38b discussed above and exits at the rear of vehicle 10b through exhaust tail pipe 36b.

As with the embodiment of FIG. 1, fuel tank 24b, fuel additive tank 40b, connecting line 42b, metering device 44b and particulate trap 38b are most preferably present in this embodiment and operate as previously discussed. However, those skilled in the art will appreciate that fuel additive tank 40b, connecting line 42b, metering device 44b and particulate trap 38b are optional and are not essential to the instant invention.

Storage means 26a may be located in the rear of the vehicle 10b as shown in FIGS. 1 and 2. However, in the embodiment of FIG. 3, the selective reducing agent will most preferably be contained within storage means 26b located in the wheel-well of vehicle 10b shown in phantom.

The reducing agent introduced into the air intake stream will most preferably by cyanuric acid or its equivalents and will preferably be introduced as a sublimable powder. Alternatively, the reducing agent may be introduced as a liquid treatment solution. If the desired reducing agent is $NH_3$ or $N_2H_4$, they will preferably be dissolved in a solvent such as water.

The reducing agent will be delivered to the combustion chamber of the diesel engine 12b via transportation means 70. Transportation means 70 is connected to storage means 26b. Transportation means 70 is shown as a 'black box' in FIG. 3. The reducing agent is delivered to exhaust manifold 22b via injection delivery line 84.

Figure 6:
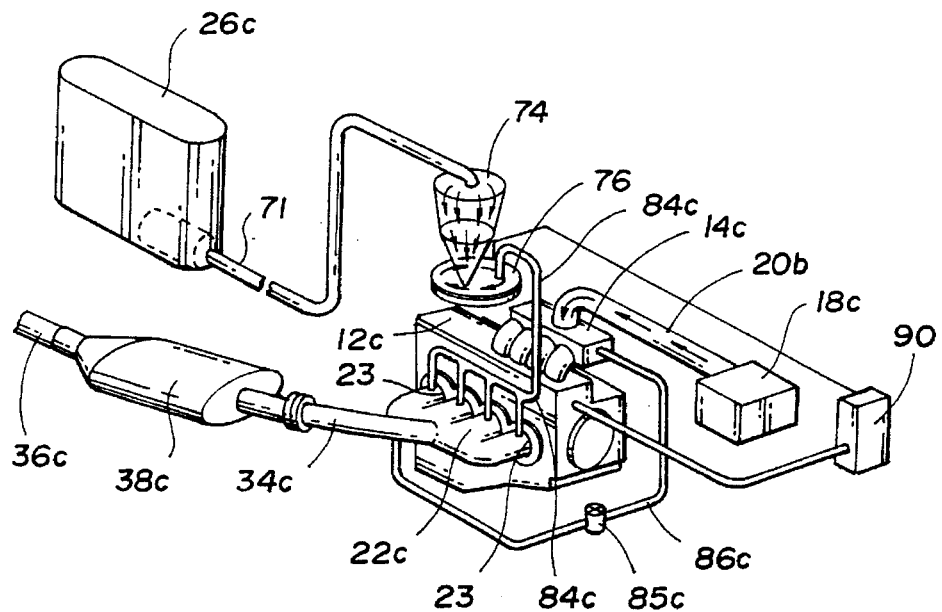
FIG. 6 is a perspective of an alternative embodiment of the $NO_x$ emission control system of FIG. 3.

FIG. 6 illustrates a preferred embodiment of transportation means 70 and the $NO_x$ emission control system disclosed in FIG. 3 as applied to an engine without turbocharger 16. Transportation means 70 is shown in FIG. 6 to consist of carrier line 71, hourglass dispenser 74, and rotating dispersal wheel 76. Carrier line 71 leaves storage means 26c with reducing agent which is carried to hourglass dispenser 74. Hourglass dispenser 74 uses gravity to agitate the preferably solid reducing agent and to direct the reducing agent to a desired location. The reducing agent is dispensed onto rotating dispersal wheel 76. The rotating action of wheel 76 injects the particles of the reducing agent into injection delivery line 84c and are carried to exhaust manifold 22c. Upon introduction to the hot engine exhaust, the reducing agent will sublime if necessary, and decompose to produce the desired reactive species.

Most preferably the reducing powder will enter the exhaust stream at the point where it has the greatest temperature, that is closest to the exhaust ports 23 leaving the combustion chambers of engine 12c. A portion of the engine exhaust stream is diverted by EGR line 86c and EGR valve 85c back to intake manifold 14c. The remainder of the engine exhaust stream enters exhaust conduit 34c and particulate trap 38c and exits through tail pipe 36c. In this embodiment as in the one shown in FIG. 3, only a portion of the reducing agent is introduced into the combustion chamber. The remainder will act upon $NO_x$ present in the post combustion engine exhaust stream.

The amount of reducing agent delivered to engine 12c is regulated by powder dispersal control unit 90. Control unit 90 measures peak combustion temperatures in engine 12c. At periods of increased engine load, increased combustion temperatures will be measured by control unit 90 and correspondingly increased amounts of reducing agent will be delivered by hourglass dispenser 74 and rotating wheel 76.

Figure 4:
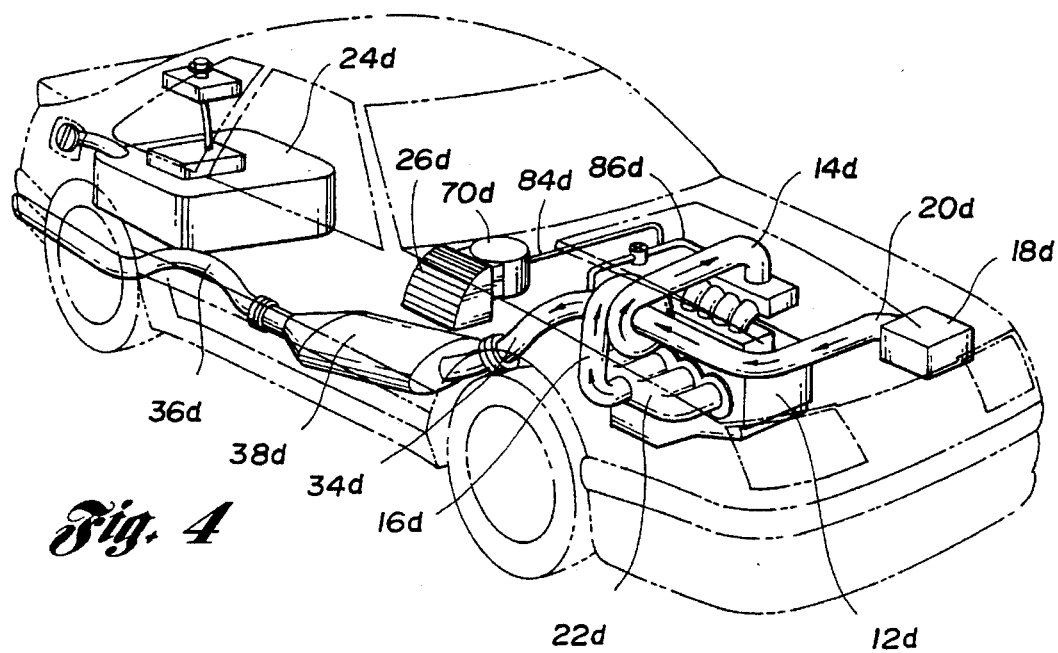
FIG. 4 is a perspective of an automotive vehicle having a diesel engine and a third alternative embodiment of the $NO_x$ emission control system of the invention.

Turning now to FIG. 4, it can be seen that alternatively, transportation means 70d may inject the reducing agent directly into EGR line 86d via delivery line 84d. Reducing agent will sublime if so required and will be transported to the combustion chamber. In this embodiment all of the reducing agent will be directed toward the combustion chamber.

Figure 5:
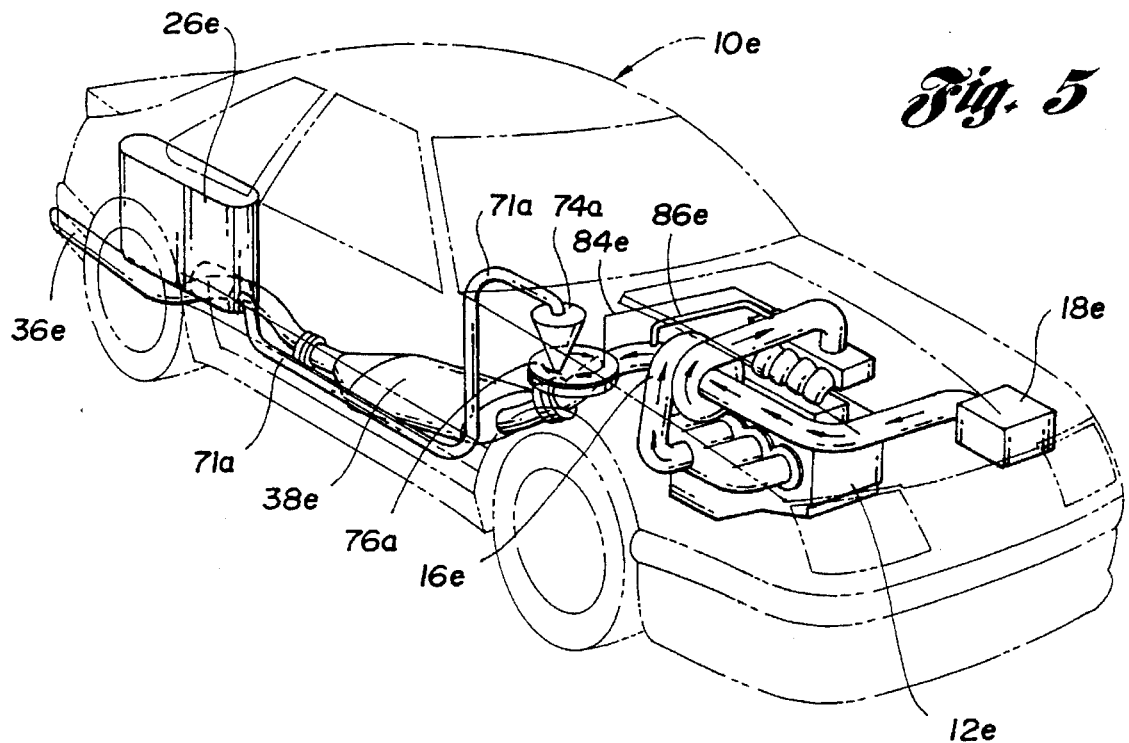
FIG. 5 is a perspective of an automotive vehicle with a diesel engine and the $NO_x$ emission control system of FIG. 4 with an alternative location for storage means 26.

FIG. 5 shows the embodiment of FIG. 4 but with an alternative position for storage means 26e. Carrier line 71a transports the reducing agent up the length of vehicle 10e, shown in phantom, to hourglass dispenser 74a and rotating wheel 76a.

Figure 7:
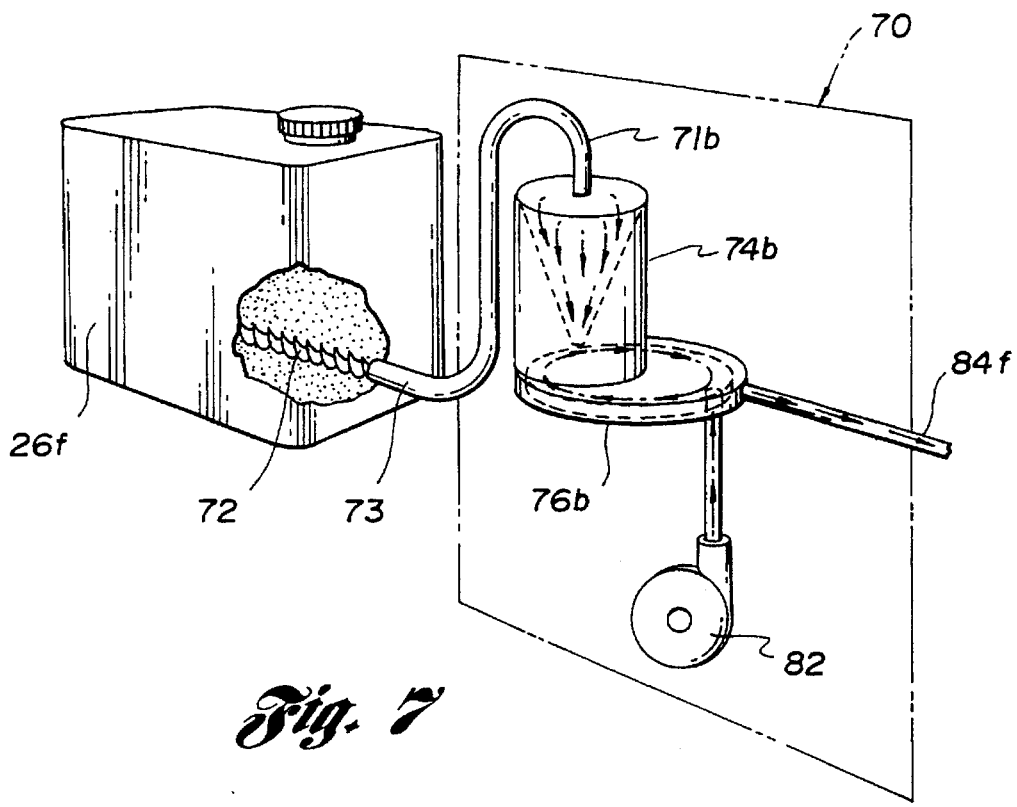
FIG. 7 is a perspective of a first alternative embodiment of the storage means and transportation means of the $NO_x$ emission control system of FIGS. 3 and 4.

In FIG. 7, the carrier line 71b is shown as a plastic screw auger 72 covered by a flexible cable 73. This transports the reducing agent to an hourglass dispenser 74b which serves to direct the solid reducing agent to a desired location. The dispenser 74b also agitates the solid reducing agent via gravitational forces so as to facilitate sublimation. The hourglass dispenser 74b dispenses the reducing agent onto rotating dispersal wheel 76b. In FIG. 7 it will be appreciated that the air born solid reducing agent will be carried by injection line 84f to the desired point of entry.

Figure 8:
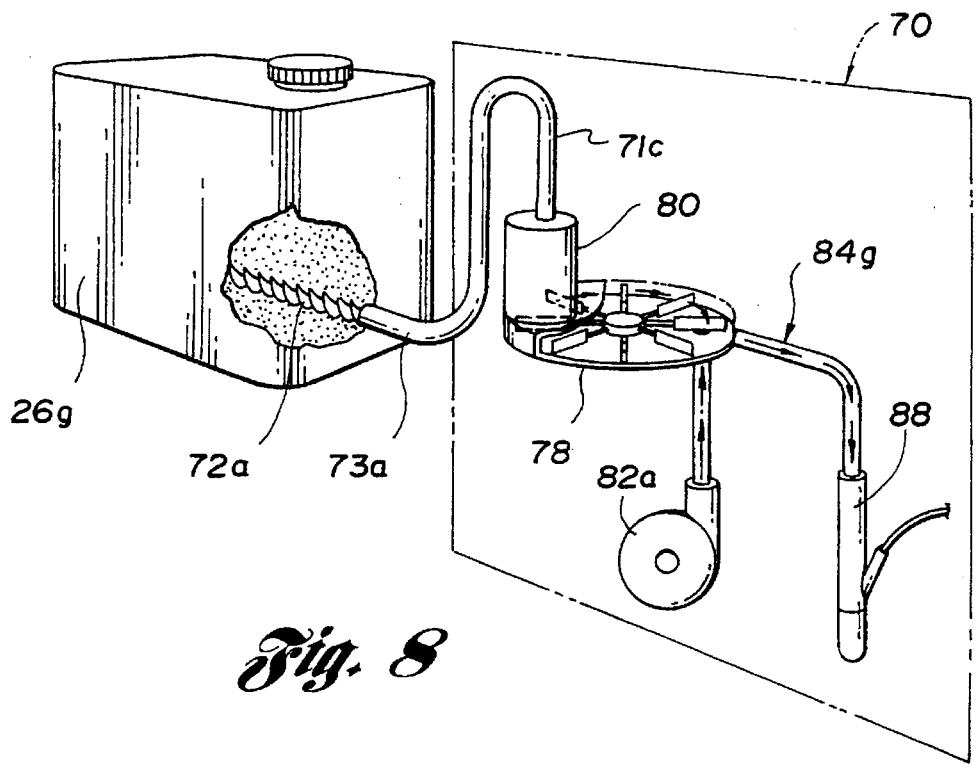
FIG. 8 is a perspective of a second alternative embodiment of the storage means and transportation means of the $NO_x$ emission control system.

Alternatively, as illustrated in FIG. 8, the carrier line 71c may transport the reducing agent to a geared wheel 78 with a hammer device 80. Hammer device 80 will agitate the reducing agent so as to facilitate sublimation. It also serves to direct the reducing agent to a desired location.

Most preferably, a high temperature air pump 82 will aid in the sublimation and dispersal of the reducing agent into the desired air stream. Although this aspect of the invention is shown only in FIGS. 7 and 8 it will be appreciated that the high temperature air pump is a most preferred part of transportation means 70 shown in FIGS. 3 and 4.

Finally, as disclosed in FIG. 8, delivery line 84g may direct the reducing agent to hollow glow plug 88. Those skilled in the art will appreciate that glow plug 88 will be positioned within the interior of the combustion chamber of diesel engine 12. An advantage of this is that the entire amount of reducing agent can be directly introduced into the combustion chamber.

It will be appreciated that the powder dispersal control unit 90 may be utilized with all of the embodiments disclosed in FIGS. 3 through 8.

While the best modes for carrying out the invention have been described in detail, those familiar with the art to which the invention pertains will recognize alternative designs and embodiments for practicing the invention as defined by the following claims.

We claim:

1. A method of reducing the concentration of $NO_x$ in the exhaust stream of an internal combustion engine capable of combusting an air/fuel mixture in the interior of a piston-cylinder assembly, wherein air is fed into the interior of a piston-cylinder assembly by an air feed stream and fuel is fed into the interior of the piston-cylinder assembly by a fuel feed stream, comprising the steps of:

introducing an effective $NO_x$ reducing amount of a solution of a selective reducing agent that decomposes upon combustion consisting essentially of a compound selected from the group consisting of cyanuric acid; cyanuric acid in which one or more hydroxyl groups are substituted by —$NH_2$, —NHR, or —$NR_2$ where R is a $C_{1-4}$ alkyl group; isocyanuric acid; and mixtures thereof, and a solvent which is soluble in the fuel feed stream into a fuel feed stream;

introducing said air feed stream and said fuel feed stream into the interior of the piston-cylinder assembly to form an air/fuel mixture which initiates a premixed flame phase of combustion, such that said selective reducing agent is present during the initiation of said premixed flame phase of combustion;

combusting said air/fuel mixture, wherein said selective reducing agent reduces the concentration of $NO_x$ present in the exhaust stream, and wherein said selective reducing agent is introduced into said fuel feed stream in an effective $NO_x$ reducing amount up to a molar ratio of 1:2 with respect to the molar amount of $NO_x$ which would be present in the exhaust stream in the absence of said selective reducing agent.

2. The method of claim 1 wherein said compound is dissolved in a solvent selected from the group consisting of dimethylsulfoxide, dimethylacetamide, dimethylformamide, and dimethylpyridine to form a treatment agent solution.

3. The method of claim 2 wherein said compound is dissolved in dimethylsulfoxide.

4. The method of claim 2 wherein said compound is cyanuric acid.

5. The method of claim 2 wherein a treated fuel mixture, formed by adding said treatment agent solution to engine fuel, is injected directly into the piston-cylinder assembly of the internal combustion engine.

6. The method of claim 5 further comprising the steps of:

providing a solution containing an organometallic fuel additive;

adding a portion of the organometallic fuel additive solution to the source of fuel containing the treated fuel mixture; and providing an exhaust oxidation catalyst selected from the group consisting of the noble metals, transition metals, and mixtures thereof;

such that combustion of the resulting fuel mixture produces an oxygen rich exhaust gas stream containing the oxidation product of the organometallic fuel additive and having reduced levels of $NO_x$.

7. The method of claim 6 further comprising the step of contacting the exhaust oxidation catalyst with said oxygen rich exhaust gas stream so that the oxidation product of the organometallic fuel additive is deposited on a surface of the exhaust oxidation catalyst.

8. A method of reducing the concentration of $NO_x$ in an exhaust stream of a compression ignition engine having lean operating conditions, wherein air is fed into the interior of a piston cylinder assembly of the compression ignition engine by an air-feed stream and fuel is fed into the interior of the piston cylinder assembly by a fuel feed stream, comprising the steps of:

providing a compression ignition engine having the piston-cylinder assembly and the fuel feed stream, the piston-cylinder assembly having an interior wherein combustion of an air and fuel mixture may occur;

providing a selective reducing agent that decomposes upon combustion consisting essentially of a compound selected from the group consisting of cyanuric acid; cyanuric acid in which one or more hydroxyl groups are substituted by $-NH_2$, $-NHR$, or $-NR_2$ where R is a $C_{1-4}$ alkyl group; isocyanuric acid; and mixtures thereof;

dissolving said selective reducing agent in a solvent which is soluble in the fuel feed stream to form a treatment agent solution;

mixing a $NO_x$ reducing amount of said treatment agent solution into the fuel feed stream, so as to produce a treated fuel mixture; and introducing a $NO_x$ reducing amount of said treated fuel mixture into said interior of the piston-cylinder assembly, such that said treated fuel mixture mixes with the air from the air feed stream to form an air and fuel mixture which initiates a premixed flame phase of combustion, wherein said treated fuel mixture is present during initiation of the premixed flame phase of combustion;

combusting said air and fuel mixture, wherein said cyanuric acid reacts with one or more products of combustion to reduce the concentration of $NO_x$ present in the exhaust stream, and wherein said selective reducing agent is introduced into said fuel feed stream in an effective $NO_x$ reducing amount up to a molar ratio of 1:2 with respect to the molar amount of $NO_x$ which would be present in the exhaust stream in the absence of said selective reducing agent.

* * * * *